June 23, 1964   R. S. ROSS   3,138,506
METHOD OF MAKING AN ARTICLE OF STIFFENED FIBROUS MATERIAL
Filed Dec. 8, 1959

INVENTOR.
ROBERT S. ROSS
BY
ATTORNEY

United States Patent Office 3,138,506
Patented June 23, 1964

3,138,506
METHOD OF MAKING AN ARTICLE OF
STIFFENED FIBROUS MATERIAL
Robert S. Ross, Warrensville Heights, Cleveland, Ohio, assignor to Goodyear Aerospace Corporation, a corporation of Delaware
Filed Dec. 8, 1959, Ser. No. 858,233
2 Claims. (Cl. 156—156)

This invention relates to methods of making articles of stiffened fibrous material and is especially useful where a stiff hollow article of extremely light weight is desired.

It has been proposed to provide hollow articles of pliable sheet material and to stiffen them by inflation. However, such articles lose their shape and stiffness and collapse upon exhaust of the inflating medium. Another disadvantage of such articles is the tendency for an inflated article to become a sphere and therefore any inflation causes distortion and inflating pressures are limited.

It has also been proposed to provide inflatable articles of woven material in which opposite parallel layers of woven fabric are held in spaced relation by ties or drop threads interwoven with and interconnecting the walls with each other to resist distortion under pressure created by air or other gaseous medium confined between the layers. Such ties or cross threads are only partially effective in eliminating distortion and the layers are puffed outwardly between the ties under even low inflation pressures. Furthermore such inflatable articles collapse completely upon exhaust of the inflation medium.

The present invention aims to overcome the foregoing and other difficulties.

It is an object of the invention to provide a light weight inflatable article which will retain its shape and size when inflation pressure is reduced.

It is a further object of the invention to provide such an article having such resistance to distortion as to permit further inflation at increased pressures.

Another object of the invention is to stiffen inflatable articles by facing them under pressure with glass fiber and resinous material and hardening the resinous material to prevent collapse of the article.

A still further object of the invention is to provide a pliable article having spaced fibrous walls and ties connecting the spaced walls to inflate the fibrous article and to apply a resin bonded fibrous material thereover, and to harden the resinous bond while the article is inflated to tension the material.

Further objects are to provide a novel hollow article and to provide a novel advance in procedure.

These and other objects will appear from the following description and the accompanying drawings.

Figure 1:
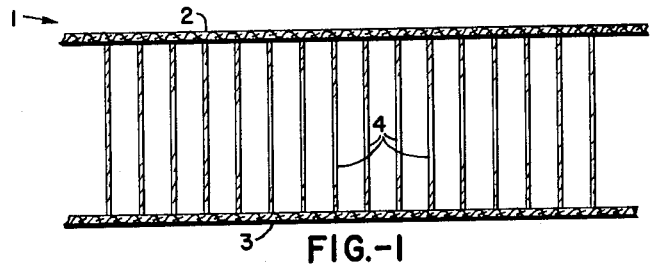
FIG. 1 is a cross-sectional view of a woven fabric having spaced parallel layers held in spaced relation by drop threads.

Referring to the drawing, and first to FIG. 1 thereof, the numeral 1 designates a woven body of textile material having parallel spaced apart woven layers 2, 3 held in spaced apart relation by drop threads 4. In one fabric of this type, tie threads are woven into one woven layer of the spaced layers for a distance and are then dropped down to the other layer and woven therein for a distance and then are passed back to the first layer so that continuous threads are employed to provide the spacing or tie threads during weaving of the layers. The tie threads are of predetermined length to maintain the layers in the desired spaced apart relation. The tie threads are substantially inextensible so as to hold the layers in the desired relation when pressure is provided between the layers.

In the example shown in FIG. 1 the tie threads are of equal length to hold the layers 2, 3 in parallel relation.

Figure 2:
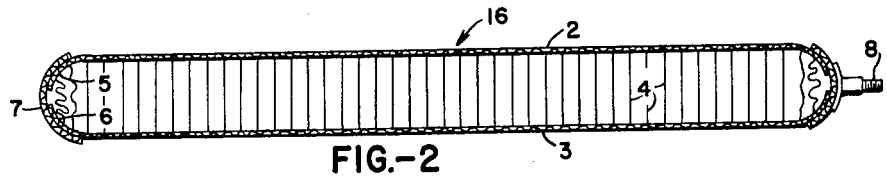
FIG. 2 is a cross-sectional view of a closed hollow article constructed from the fabric of FIG. 1.
Figure 3:
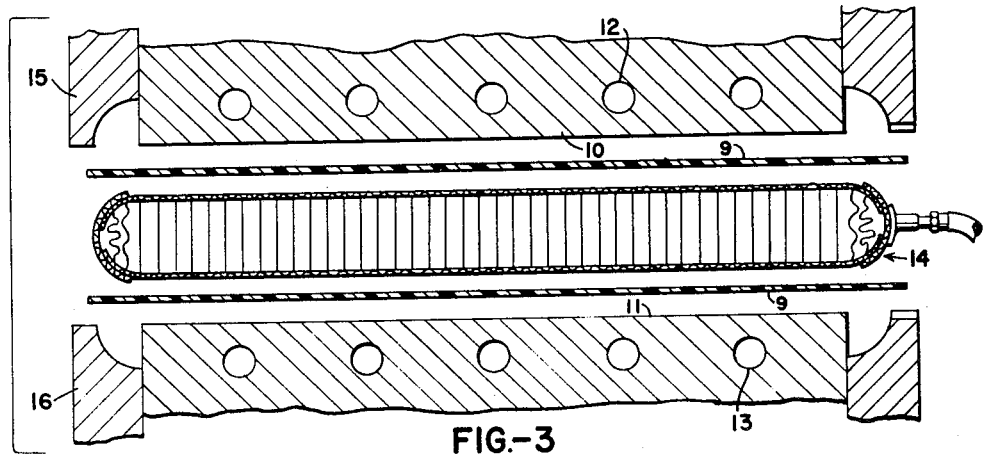
FIG. 3 is a cross-sectional view of a molding apparatus, the closed fabic article of FIG. 2 and layers of resin bonded fibrous material for assembly therewith.
Figure 4:
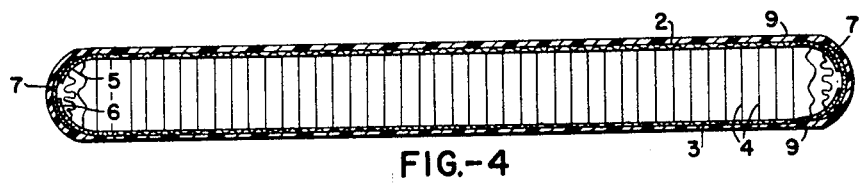
FIG. 4 is a cross-sectional view of the assembled article removed from the molding apparatus.

To provide a closed inflatable structure such as shown in FIG. 2, margins 5, 6 of layers 2, 3 are folded inwardly into abutting relation, as shown in FIG. 2 and a reinforcing band 7 of fabric tape is mounted over the abutting margins and secured thereto. In order to provide an airtight structure the woven fabric may be coated or impregnated with a liquid dispersion or emulsion to seal the pores thereof and the tapes 7 may be of similar material. The impregnating material is preferably one that will bond the tape to the layers 2, 3 by adhesion and preferably retains at least a part of the expansibility or extensibility of the fabric material. Plastic material or synthetic rubber-like materials may be used for this purpose as impregnating or coating and cementing mediums.

A tubular valve or inflation nipple 8 may be built into or attached to the closed body to permit inflation.

The inflatable body of FIG. 2 will hold its shape only approximately upon inflation, for example to pressures between six and twelve p.s.i., as the layers 2 and 3 will bow slightly outwardly between the ties 4. To provide greater strength of the article and at the same time to stiffen its walls against bulging or other deformation in accordance with the present invention layers 9 of resin bonded unwoven fibers such as glass fibers are secured over the fabric layers 2 and 3. For this purpose a pair of opposed mold platens 10, 11 are provided such as the platens of a hydraulic press and these may be heated by steam circulated therein through passages 12, 13. Layers 9 of glass fibers bonded by resin material are laid between the inflated fabric body 14 and the platens 10 and 11 and are pressed against and secured to the faces of the body 14. The body 14 may be coated with epoxy resin or other cementing material before applying the fiberglass layers thereto and the fiberglass layers may be heated and pressed thereagainst until permanently united thereto. Any slight irregularities or outward bowing are flattened out during this molding operation.

Where stiffness of the article is desired and a lower tensile strength of the face layers is satisfactory the sheets 9 may be of plastic material omitting the glass or other fibers, the plastic being of a type which will stiffen the walls of the article when thermoset thereon.

In order to form the layers 9 about their margins to conform to the fabric body, vertically movable mold members 15 and 16 may be provided about platens 10 and 11 respectively and separate means may be provided to move them toward one another to confine the body 14 and conform the layers thereto.

Figure 5:
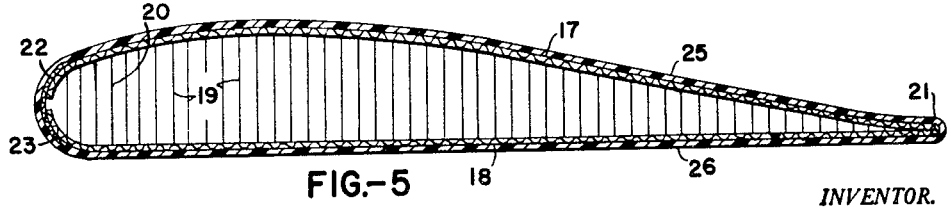
FIG. 5 is a cross-sectional view of an airfoil constructed in accordance with and embodying the invention.

Now referring to FIG. 5 this shows a cross-section of an airfoil produced in a similar manner. Here the opposite surface layers 17, 18 are constructed in non-parallel relation of woven material and the drop threads 19 therebetween are not of uniform length but are made determinately of different lengths to provide the desired cross-sectional shape. At position 20 the layers 17, 18 are well spaced apart but at position 21 they may merge into a single layer. The margins 22, 23 are turned inwardly after weaving and brought into abutting relation as shown and a tape or strip 24 is cemented thereto along the seam. After a valve connection (not shown) has been secured to the fabric body, the body is treated as by coating of resinous material to render it airtight. Layers of stiffening sheet plastic material are then applied over the surfaces of the body and molded thereon to provide covering 25, 26.

In forming hollow articles by this method it is possible and advisable to form the fabric body by weaving and closing it as described above then coating it with a cement such as an epoxy resin, inflating it to a low pressure, enclosing it with layers of thermoplastic stiffening material or resin bonded glass fibers, removing it from the confining mold and then inflating it to a higher pressure, for example, twice as much as normal inflation previously mentioned, to tension more strongly the tie threads and other fabric elements. Inflation at the higher pressure after molding provides a particularly strong, light and rigid article of the desired shape.

It is also possible to inflate the structure to a lower pressure after molding inasmuch as the structure is inherently more rigid without having to rely so much on inflation for rigidity.

It will be recognized that it is completely within the scope of the invention to utilize metal tie threads as well as fibrous tie threads at 4 and to use metal surfacing layers as well as plastic surfacing layers at 9.

While certain representative embodiments and details have been shown for the purpose of illustrating the invention, it will be apparent to those skilled in this art that various changes and modifications may be made therein without departing from the spirit or scope of the invention.

What is claimed is:
1. The method of making a hollow article which comprises providing a closed article having opposed walls of woven fabric and threads extending from one layer to another in determinate arrangement to hold the walls in determinate spaced relation, impregnating the article with plastic to render it gas-tight, inflating the article under slight pressure to tension the threads, enclosing the inflated article with thermosetting sheet material including fiberglass, molding the thermosetting material about the article, and then inflating the article to a higher pressure to more greatly tension the threads and render the article ready for load bearing use.

2. The method of making a hollow article which comprises forming a closed article having opposed flexible fabric walls and woven-in tie members at intervals holding the walls in determinate spaced relation, impregnating the article with plastic to render it gas-tight, inflating the article at a low pressure to tension the tie members, enclosing the article with a layer of fiberglass resin bonded stiffening material, thermosetting the stiffening material, and then inflating the article at a higher pressure to additionally tension the tie members and stiffening material.

References Cited in the file of this patent
UNITED STATES PATENTS

| | | |
|---|---|---|
| 1,733,247 | Sykes et al. | Oct. 29, 1929 |
| 2,593,714 | Robinson | Apr. 22, 1952 |
| 2,743,510 | Mauney et al. | May 1, 1956 |
| 2,861,910 | Johnston et al. | Nov. 25, 1958 |
| 2,899,397 | Aelony et al. | Aug. 11, 1959 |